(12) United States Patent
Yeh (10) Patent No.: US 8,124,892 B2
(45) Date of Patent: Feb. 28, 2012

(54) ELECTROMAGNETIC MANUSCRIPT INPUT APPARATUS AND METHOD THEREOF

(75) Inventor: Chia-Jui Yeh, Hsinchu (TW)

(73) Assignee: WALTOP International Corp., Hsinchu (TW)

( * ) Notice: Subject to any disclaimer, the term of this patent is extended or adjusted under 35 U.S.C. 154(b) by 745 days.

(21) Appl. No.: 12/263,574

(22) Filed: Nov. 3, 2008

(65) Prior Publication Data

US 2010/0108410 A1    May 6, 2010

(51) Int. Cl.
*G06F 3/041* (2006.01)
(52) U.S. Cl. .................. 178/18.01; 345/173
(58) Field of Classification Search .......... 345/173–179; 178/18.01
See application file for complete search history.

(56) References Cited

U.S. PATENT DOCUMENTS

| 4,206,314 | A  | * | 6/1980 | Prugh et al. ............ 178/18.07 |
| 2007/0080940 | A1 | * | 4/2007 | Aoki et al. .................. 345/158 |
| 2008/0106520 | A1 | * | 5/2008 | Free et al. .................... 345/173 |

\* cited by examiner

*Primary Examiner* — Amr Awad
*Assistant Examiner* — Waseem Moorad (57) ABSTRACT

An electromagnetic manuscript input apparatus and a method thereof are provided for a manuscript input function. The electromagnetic manuscript input apparatus includes an electromagnetic pen and a digitizer. The digitizer includes a plurality of antennas and windings orthogonally distributed for inducing the electromagnetic waves of the electromagnetic pen. According to the electromagnetic manuscript input method, a controller of the digitizer is used to perform a whole region scanning process to find out a position of a winding having a maximum induction potential, and further find out positions of two immediately adjacent windings. An operation equation directly derived from a Gauss distribution is provided for calculating the coordinates of the electromagnetic pen on the digitizer based on the three positions and their corresponding induction potentials.

11 Claims, 8 Drawing Sheets

ELECTROMAGNETIC MANUSCRIPT INPUT APPARATUS AND METHOD THEREOF

BACKGROUND OF THE INVENTION

1. Field of the Invention

The present invention relates generally to an electromagnetic manuscript input apparatus and a method thereof, and more particularly, to an electromagnetic manuscript input apparatus and a method thereof adapted for precision positioning.

2. The Prior Arts

Computers, terminals, and other similar electronic devices should be provided with suitable input apparatuses for allowing users to input instructions, data, or select menus displayed on displays. In such a way, the computer, the terminals and the electronic devices can be controlled to work. Input apparatuses are normally categorized into contact type input apparatuses and noncontact type input apparatuses. The contact type input apparatuses include keyboard, mouse, joystick, touch panel, lightpen, remote control, digitizer, while the noncontact type input apparatuses include voice input device.

A digitizer or an electromagnetic white board should be facilitated by an electromagnetic pen for operation. In operation, the electromagnetic pen approaches or touches the digitizer, in accordance with a cursor or an image displayed on the display apparatus, to select a function menu, handwrite characters or draw a diagram. The electromagnetic pen is a very convenient input apparatus. Currently, the electromagnetic pen, and particularly the handwriting and drawing function thereof, has become widely employed in a variety of electronic products, such as computers, terminals, mobile phones, handheld digital secretaries, and touch panels.

An electromagnetic pen is a pen shaped input apparatus, including a winding, a capacitor, and a circuit board. The electromagnetic pen is capable of emitting electromagnetic waves. An electromagnetic pen may be either an active type, or a passive type. An active type electromagnetic pen includes a power supply, and a passive type electromagnetic pen does not include a power supply. The power supply of the active type electromagnetic pen is usually a battery. The passive type electromagnetic pen usually obtains power from the electromagnetic waves emitted by the digitizer, in which the electromagnetic pen has to obtain power by inducing the electromagnetic waves emitted from the digitizer.

Figure 1:
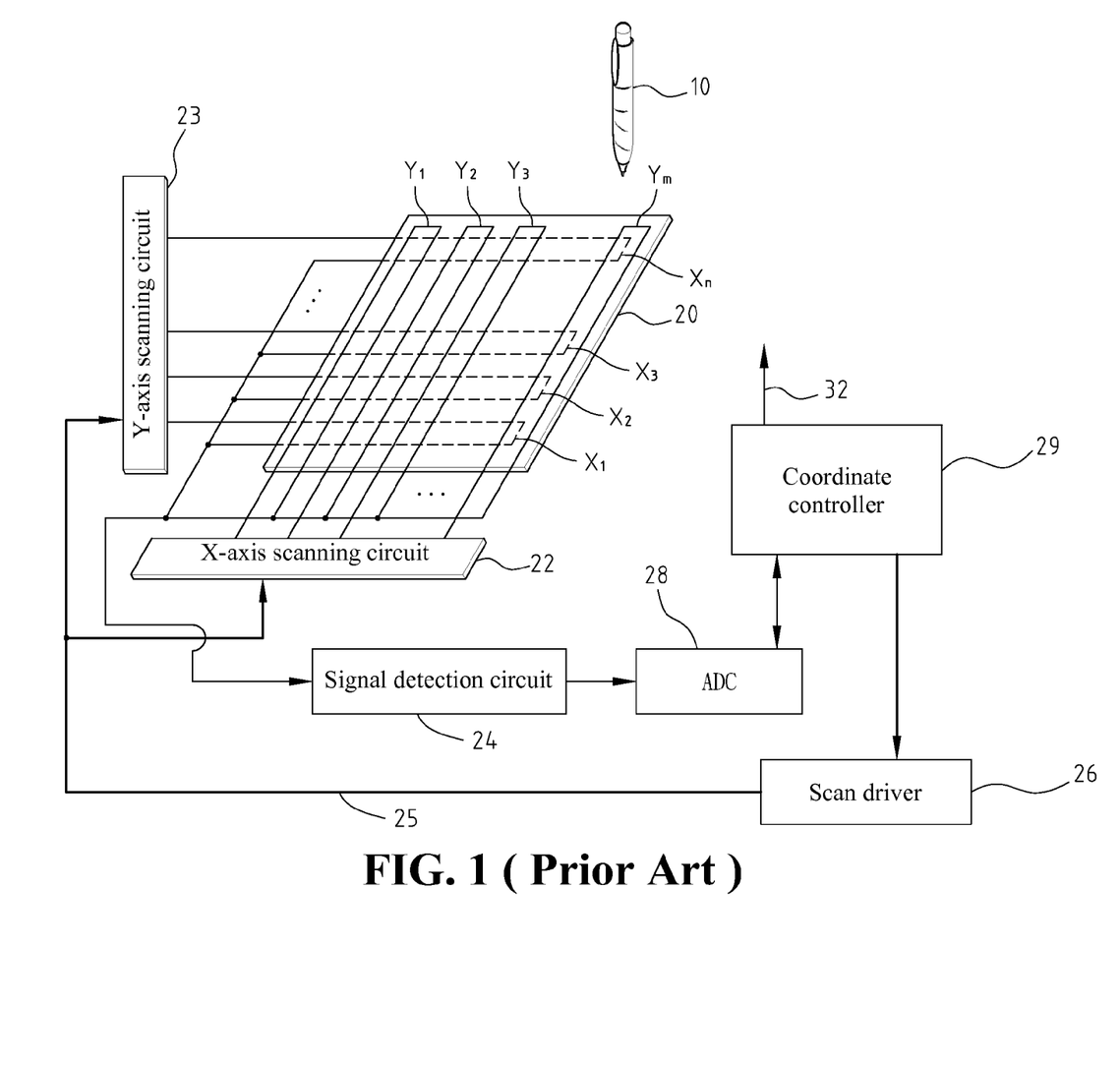
FIG. 1 is a functional block diagram illustrating a conventional electromagnetic manuscript input apparatus.

Referring to FIG. 1, there is shown a functional block diagram illustrating a conventional electromagnetic manuscript input apparatus. The conventional electromagnetic manuscript input apparatus includes an electromagnetic pen 10 and a digitizer 20. The electromagnetic pen 10 includes a winding, a capacitor, and a circuit board (not shown in the drawing), and is capable of emitting electromagnetic waves. The digitizer 20 includes a plurality of X windings, a plurality of Y windings, an X scanning circuit 22, a Y scanning circuit 23, a signal detection circuit 24, a scan driver 26, an analog to digital converter (ADC) 28, and a coordinate controller 29, for generating a coordinate output signal 32 and transmitting the same to a posterior stage processing device, e.g., a computer, or a transmission interface such as a universal serial bus (USB) interface.

Reference numerals X1, X2, X3 . . . , represent the X windings. For example, Xn represents the $n^{th}$ X winding. Reference numerals Y1, Y2, Y3 . . . , represent the Y windings. For example, Ym represents the $m^{th}$ Y winding. The X windings and the Y windings are adapted for inducing the electromagnetic waves emitted from the electromagnetic pen 10, and generating an induction potential.

The coordinate controller 29 controls all operations of the electromagnetic manuscript input apparatus. The scan driver 26 receives a control driving signal from the coordinate controller 29, and transmits a scan driving signal 25 to the X scanning circuit 22 and the Y scanning circuit 23. The X scanning circuit 22 and the Y scanning circuit 23 drive a plurality of X windings and a plurality of Y windings, respectively. When an X winding or a Y winding is driven, an induction potential of the X winding or the Y winding is detected by the signal detection circuit 24. Correspondingly, the posterior stage ADC 28 generates a digital signal, and transmits the digital signal to the coordinate controller 29. The coordinate controller 29 receives and processes the digital signal (e.g., compare the digital signal with a noise threshold, or compare values of adjacent windings) so as to determine a maximum value and obtain a correct induction potential value. Then, the coordinate controller 29 repeats the foregoing steps, so as to obtain induction potential values of all of the X windings and the Y windings. One of the X windings having the maximum induction potential value represents an X coordinate to which the electromagnetic pen most approaches. Similarly, one of the Y windings having the maximum induction potential value represents a Y coordinate to which the electromagnetic pen most approaches. Precision coordinate values are usually obtained by calculations according to different algorithms. Generally, interpolation algorithms, such as first order approximation or a second order parabolic approximation, are often employed in conventional calculation methods.

Figure 2:
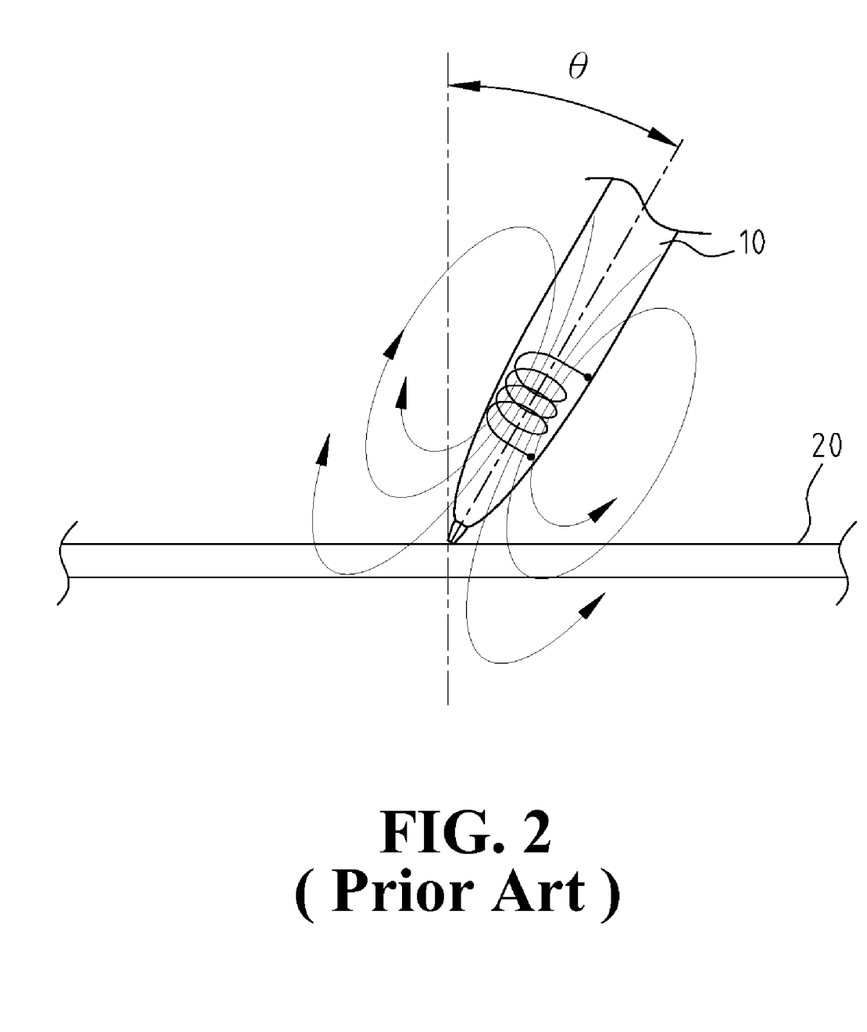
FIG. 2 is a schematic diagram illustrating an electromagnetic field of the electromagnetic pen.

Referring to FIG. 2, it is a schematic diagram illustrating an electromagnetic field of the electromagnetic pen 10. When the electromagnetic pen 10 defines a tilt angle with the digitizer 20, the tilt angle between the electromagnetic pen 10 and the digitizer 20 may generate a bias to the induction potential which should be further considered. As shown in FIG. 2, a larger tilt angle ($\theta$) indicates that the winding immediately adjacent to the tilt angle ($\theta$) generates a larger induction potential. As such, the bias caused by the tilt angle ($\theta$) should be compensated or regulated.

Figure 3:
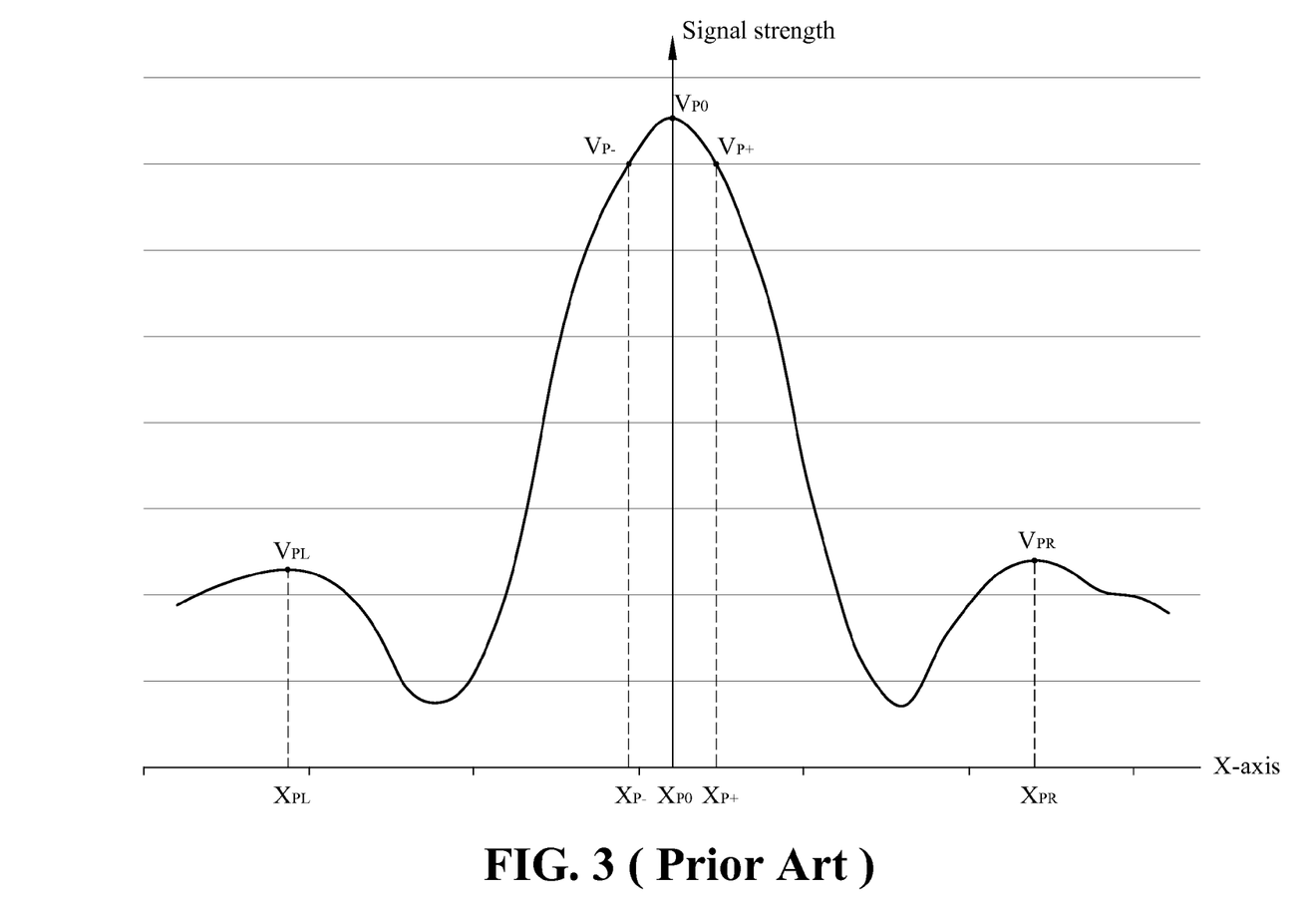
FIG. 3 illustrates an induction potential distribution of the electromagnetic pen relative to the digitizer.
Figure 4:
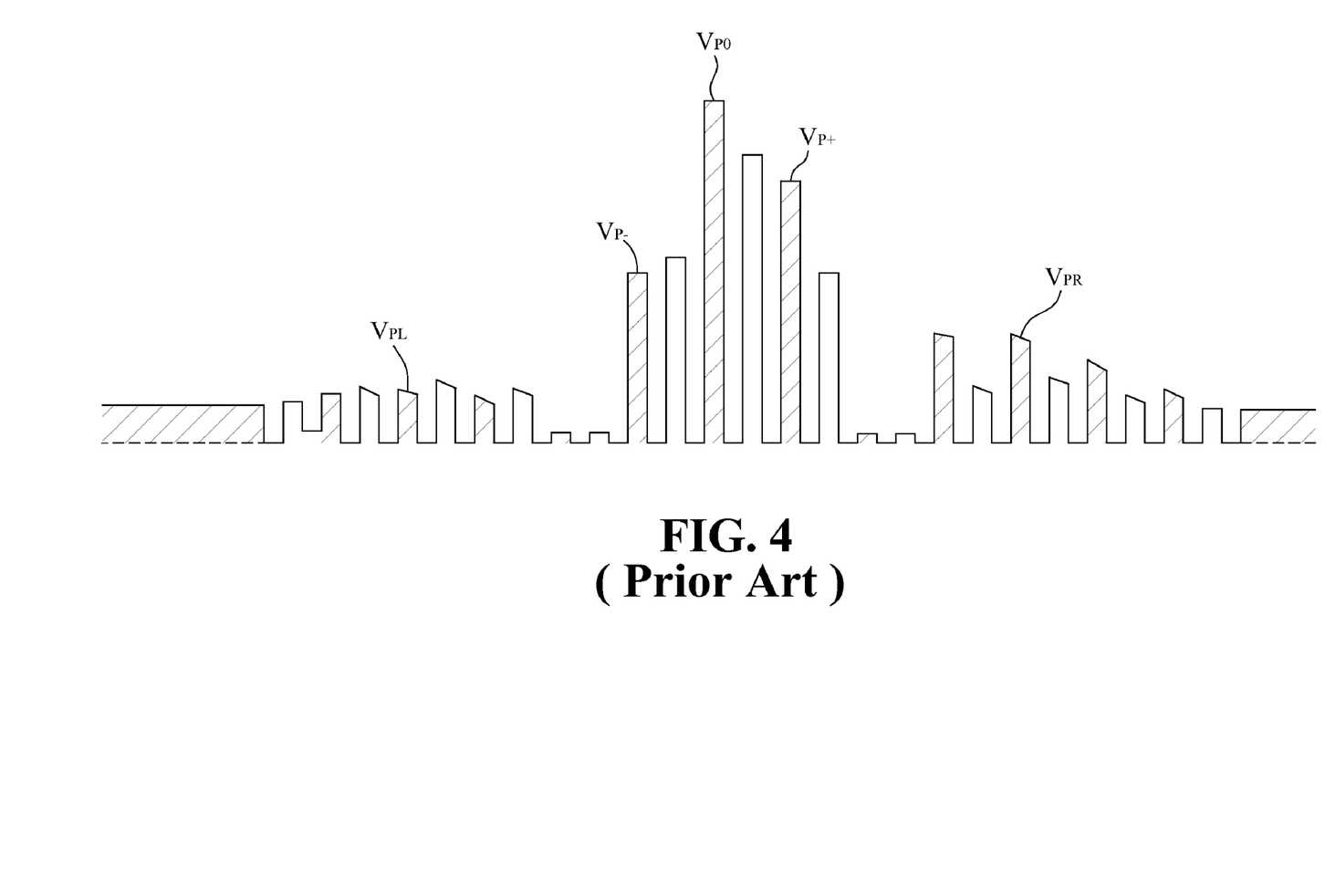
FIG. 4 illustrates an induction potential distribution of an antenna winding of the digitizer.

Referring to FIG. 3, it illustrates an induction potential distribution of the electromagnetic pen relative to the digitizer. As shown in FIG. 3, the curves are not bilateral symmetrical. This indicates that the electromagnetic pen 10 is tilted. An X winding XP0 most adjacent to the electromagnetic pen 10 has an induction potential having a maximum peak value VP0, and a limit value (VPR, VPL) at a right side XPR and a left side XPL respectively. Further, two immediately adjacent windings (XP+, XP−) of the XPO winding have corresponding induction potentials (VP+, XP−), respectively. Referring to FIG. 4, it illustrates an induction potential distribution of an antenna winding of the digitizer, in which the slashed filled columns represent induction potentials of the X windings, while the blank columns represent that there is no X winding. Comparing with FIG. 3, FIG. 4 is simplified for more clearly depicting the coordinate positioning method of the conventional technologies, in which same numerals represent similar matters.

According to the first order approximation of the conventional technology, the coordinates of the electromagnetic pen 10 can be obtained by an interpolation algorithm. For example, the X coordinate of the electromagnetic pen 10 can be obtained from positions the windings XP0, XPR, XPL, XP+, XP−, and their corresponding induction potentials VP0, VPR, VPL, VP+, VP−, facilitated by a memory (e.g., a ROM) recording regulation values. Similarly, the Y coordinate of the electromagnetic pen 10 can also be obtained. A correct X coordinate can be obtained according to equation (1) as below:

$$D=Sx*T+Q/G+H(f) \quad (1),$$

in which D represents the correct X coordinate, Sx represents a serial number of the wiring having the maximum induction potential, T represents a coordinate value represented by a space between wirings (for the purpose of simplification, the wirings are uniformly-spaced hereby), G represents a constant, Q represents parameters related to the induction potentials VP0, VPR, VPL, f represents parameters related to the induction potentials VPR, VPL, and H(f) represents regulation values related to f. Further, $$Q=(VP0-VP+)/(VP0-VP-), VP+ \geq VP-; \text{ or}$$

$$Q=(VP0-VP-)/(VP0-VP+), VP+<VP-,$$

while the regulation values of H(f) are recorded in the memory.

According to the second order parabolic approximation of the conventional technology, the coordinates of the electromagnetic pen 10 are obtained by a second order approximation interpolation algorithm. For example, the wiring positions XP0, XPR, XPL and their corresponding induction potentials VP0, VPR, and VPL are accorded for calculating the X coordinate of the electromagnetic pen 10 by an equation (2) as:

$$VPL=a*(XPL-D)^2+b$$

$$VP0=a*(XP0-D)^2+b$$

$$VPR=a*(XPR-D)^2+b \quad (2).$$

Solving the equation (2), it can be obtained as:

$$D=XPL+T/2*\{(3*VPL-4*VP0+VPR)/(VPL-2*VP0+VPR)\}$$

The conventional first order approximation interpolation has some disadvantages. For example, the induction potentials of the first order approximation interpolation are similar to a Gauss distribution, thus having a large error, and requiring a memory recording regulation values to provide compensation thereto. However, a system having more windings requires a larger memory, and therefore the hardware cost and complexity are increased correspondingly. This may even impair the reliability of the product. Further, mutual inductions between adjacent windings may also lower the precision of the method.

The conventional second order approximation interpolation also has disadvantages. For example, the induction potentials of the second order approximation interpolation are similar to a Gauss distribution, thus also having a large error. Therefore, the layout of the adjacent windings is restricted. For example, the space between the adjacent windings should be lowered, and the electromagnetic pen is restricted from being too close to the windings, for compensating the large error.

As such, it is very much desired to provide an apparatus and a method for accurately positioning the coordinate positions of the electromagnetic pen, for satisfying the higher system requirement for accuracy, and decreasing the complexity of the hardware design, and further improving the reliability of the product.

SUMMARY OF THE INVENTION

A primary objective of the present invention is to provide an electromagnetic manuscript input method. The electromagnetic manuscript input method employs a log coordinate positioning equation deducted from a Gauss distribution function to conduct log, multiply, and add operations to obtain precision coordinates of an electromagnetic pen.

Another objective of the present invention is to provide an electromagnetic manuscript input apparatus. The electromagnetic manuscript input apparatus is adapted to realize a log coordinate positioning equation capable of conducting log, multiply, and add operations, by utilizing a log circuit and an operation circuit. In such a way, precision coordinates of the electromagnetic can be obtained by the real Gauss distribution function that can be approximated to.

A further objective of the present invention is to provide an electromagnetic manuscript input apparatus. The electromagnetic manuscript input apparatus utilizes a processor in a coordinate controller to conduct a log coordinate positioning equation capable of conducting log, multiply, and add operations, so as to obtain precision coordinates of the electromagnetic and approximate to the real Gauss distribution function.

A still another objective of the present invention is to provide an electromagnetic manuscript input method. According to the electromagnetic manuscript input method, a winding position having a maximum value of induction potential and positions of two immediately adjacent windings are detected by a whole region scanning process, and then induction potentials corresponding to the foregoing three windings are detected, for precisely calculating the coordinates.

As such, the foregoing method and apparatus are provided for eliminating the disadvantages of the conventional technology, so as to obtain precision coordinates of the electromagnetic pen, thus lowering the complexity of hardware, and improving the reliability of the product.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

FIG. 3 illustrates an induction potential Gauss distribution of the electromagnetic pen relative to the digitizer. The present invention provides an operation equation directly deducted from the Gauss distribution, as to be exemplified below. The Gauss distribution function is as equation (3)

$$V(Xi)=A0/(\sigma*(2*\pi)^{1/2})*\exp(-(Xi-D)/(2*\sigma^2)) \quad (3),$$

in which σ is a standard deviation.

The wiring positions XP0, XPR, XPL and their corresponding induction potentials VP0, VPR, and VPL are calculated according to the equation (3), an X coordinate D of the electromagnetic pen can be obtained as of equation (4) as:

$$D=XP0+T/2*\ln(VPR/VPL)/\ln(VP0^2/VPR/VPL) \quad (4),$$

in which XP0, XPR, XPL, VP0, VPR, VPL, and T are as above defined, and are not to be iterated hereby.

Further, the equation (4) can be simplified by a of equation (5):

$$\alpha=\ln(VPR/VPL)/\ln(VP0^2/VPR/VPL) \quad (5).$$

Equation (6) can be obtained from the equation (4):

$$D=XP0+T/2*\alpha \quad (6).$$

Similarly, the Y coordinate of the electromagnetic pen can be obtained.

In the foregoing discussion, the Gauss distribution function is used for representing the induction potentials, and deducting the coordinate equation of the electromagnetic pen, i.e., equation (4). In such a way, when the position of the winding having the maximum induction potential, the positions of two immediately adjacent windings, and the induction potentials thereof are known, the X coordinate and the Y coordinate of the electromagnetic pen can be obtained. In other words, positions of the three windings and three induction potentials thereof are required.

As such, the method of the present invention further includes a process of finding out the required positions of the three windings and the three induction potentials. The process includes: (1) conducting a whole region scanning process to find out the positions of the three required windings; (2) inputting the positions of the three windings to obtain the three induction potentials of the three windings; and (3) calculating with the positions of the three windings and the three induction potentials to obtain the coordinates of the electromagnetic pen. The process can be achieved by a hardware circuit, or a software program. Details are going to be discussed below.

First, a first embodiment of the present invention is to comply with the foregoing process by a hardware circuit.

Figure 5:
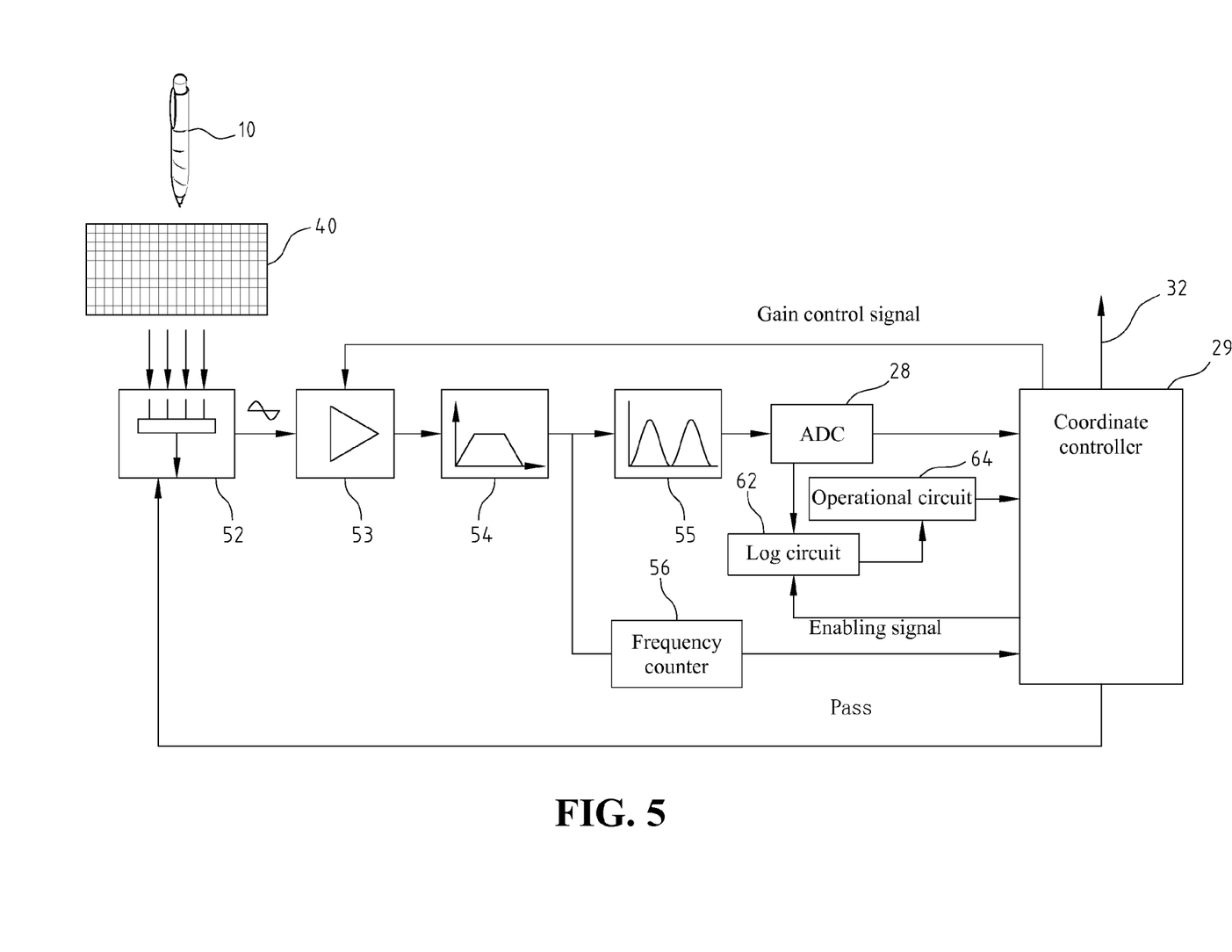
FIG. 5 is a functional block diagram of a first embodiment of the present invention.

Referring to FIG. 5, it is a functional block diagram of a first embodiment of the present invention illustrating an electromagnetic manuscript input apparatus. The electromagnetic manuscript input apparatus includes an electromagnetic pen 10, and a digitizer 40. The digitizer 40 includes a plurality of X windings (not shown), a plurality of Y winding (not shown), an X-axis scanning circuit (not shown), a Y-axis scanning circuit (not shown), a scan driver (not shown), an ADC 28, a multiplexer 52, an amplifier 53, a bandpass filter 54, a sample-and-hold circuit 55, a frequency counter 56, a log circuit 62, an operational circuit, and a coordinate controller 29. It should be noted that in the current embodiment those similar to the conventional technology can be learnt by referring to the discussion above and are not to be iterated, and for purpose of simplification and clarity of illustration, only one X winding, one Y winding, one X-axis scanning circuit, one Y-axis scanning circuit, and one scan driver are shown in the drawing without defining the amounts of the elements in the first embodiment. Further, the multiplexer 52, the amplifier 53, the bandpass filter 54, and the sample-and-hold circuit 55 have the similar function of the signal detection circuit 24 of the above discussed conventional technology. All of the multiplexer 52, the amplifier 53, the bandpass filter 54, and the sample-and-hold circuit 55 should have been well known to those skilled in the art, thus are not to be iterated hereby.

The coordinate controller 29 further includes a processor (not shown) of executing a software program. The software program can be recorded in an external memory (ROM or Flash), or recorded in an internal memory built in the coordinate controller 29. Further, the coordinate controller 29 may further include a RAM, for accelerating the processing speed.

First, the coordinate controller 29 executes a whole domain scanning process to all of the windings. Similar to conventional technologies, in the whole domain scanning process, the coordinate controller 29 emits a driving control signal to drive each of the X windings and Y windings, and detects induction potentials corresponding to the windings. However, differing from the conventional technologies, the present invention sequentially compares the values of all of the induction potentials of the windings to find out the position of the winding having the maximum induction potential, and then finds out the positions of two windings immediately adjacent thereto. Therefore, the present invention needs to find out three windings positions. On the contrary, in addition to the positions of the three windings, the conventional technologies must record induction potentials of the three windings, as well as positions of two lateral windings having relative limit peak values and the induction potentials thereof. Therefore, the conventional technologies have to find out positions of five windings and five induction potentials.

In the current embodiment, the frequency counter 56 of FIG. 5 counts the amount of inputted signals, which is equivalent to the scanning times executed to the windings. When all windings are scanned, a Pass signal is then outputted to notify the coordinate controller 29. In such a way, the coordinate controller 29 can reconfirm for avoiding misoperation caused by other interferences.

After finding out positions of the three windings, the coordinate controller 29 emits driving signals with respect to these three windings to obtain corresponding induction potential values. Then, precision coordinates of the electromagnetic pen are obtained by calculating the equation (4) with the log circuit 62 and the operation circuit 64, as shown in FIG. 5. The log circuit 62 is controlled by an enabling signal. When the enabling signal is at a high level, the log circuit 62 works, and when the enabling signal is at a low level, the log circuit 62 does not work. As such, when executing the whole region scanning process, the coordinate controller 29 emits low level enabling signals, and when conducting position calculation of the electromagnetic pen, the coordinate controller 29 emits high level enabling signals.

Figure 6:
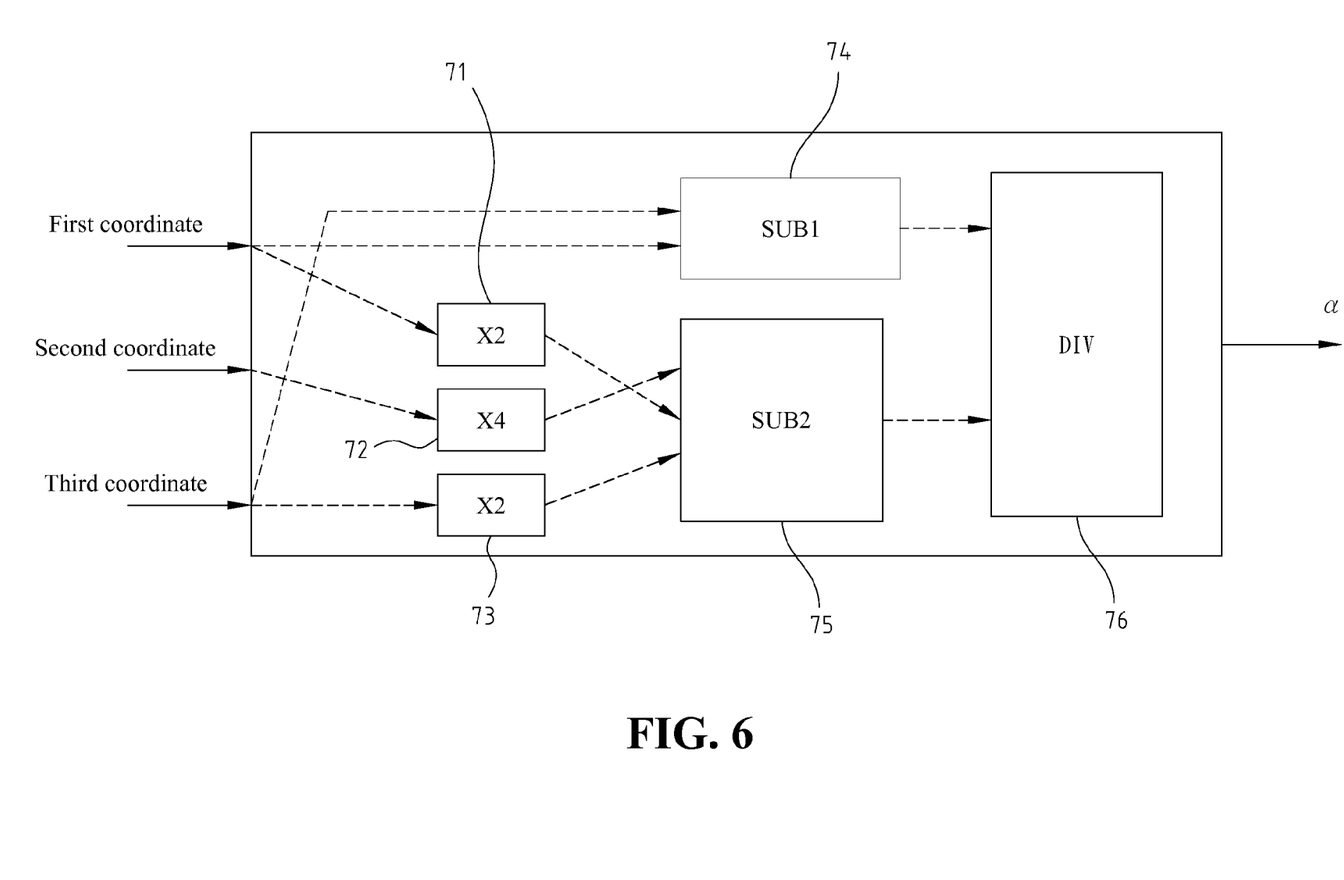
FIG. 6 is a functional block diagram of an operational circuit of the present invention.

When the coordinate controller 29 emits a high level enabling signal to initiate the log circuit 62, the log circuit 62 converts six digital signals inputted by the ADC 28 into log values, and transmits the log values to the operational circuit 64. The six digital signals are induction potentials of the three X windings and the three Y windings, respectively, which constitute three pairs of coordinates numbered as the first, the second, and the third coordinates. Referring to FIG. 6, it is a functional block diagram of an operational circuit of the present invention. The operational circuit 64 includes two ×2 multipliers 71, 73, a ×4 multiplier 72, two subtractors (SUB1 and SUB2) 74, 75, and a divider (DIV) 76, for processing the first, the second and the third coordinates, as shown in FIG. 6. The operational circuit 64 is responsible for executing the calculation of the equation (5) to obtain the a value, and transmits the a value to the coordinate controller 29. The processor (not shown) of the coordinate controller 29 then calculates the equation (6) to obtain the coordinates of the electromagnetic pen.

Figure 7:
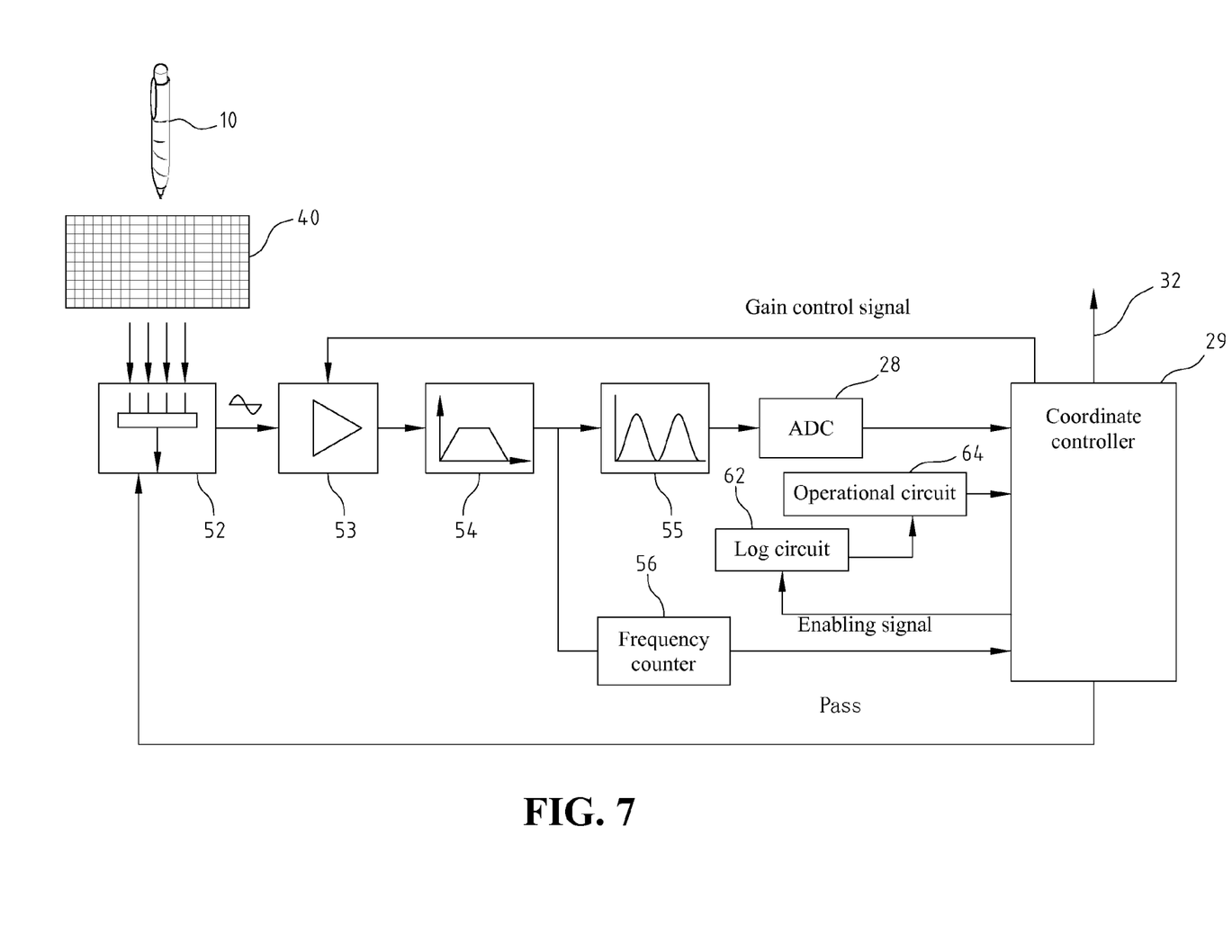
FIG. 7 is a functional block diagram of a second embodiment of the present invention.

FIG. 7 is a functional block diagram of a second embodiment of the present invention. Referring to FIG. 7, the input signal of the log circuit 62 is provided by the coordinate controller 29. As such, in the second embodiment, the digital signal of the ADC 28 is indirectly provided to the log circuit 62 via the coordinate controller 29, and the other configuration is similar to the first embodiment.

Figure 8:
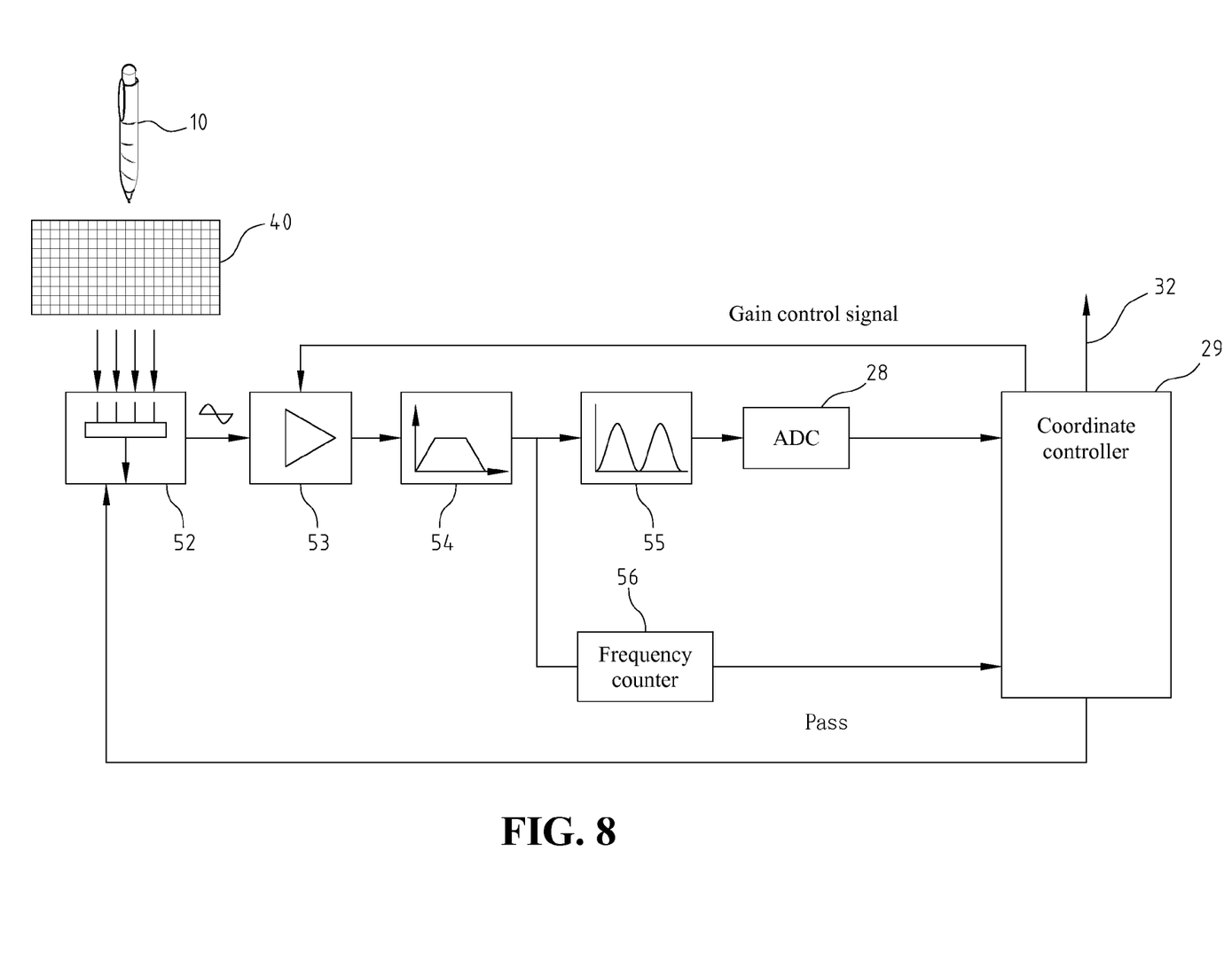
FIG. 8 is a functional block diagram of a third embodiment of the present invention.

FIG. 8 is a functional block diagram of a third embodiment of the present invention. Referring to FIG. 8, the third embodiment of the present invention does not include the log circuit 62 and the operational circuit 64. Instead, the coordinate controller 29 executes the log conversion and calculation of the log circuit 62 and the operation circuit 64. In other words, the third embodiment of the present invention realizes the equation (3) with a software program to obtain the electromagnetic pen.

As such, the method and apparatus of the present invention are adapted for fast obtaining precision coordinates of the electromagnetic pen, thus lowering the complexity of hardware, and improving the reliability of the product.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An electromagnetic manuscript input method, applicable for an electromagnetic manuscript input apparatus comprising an electromagnetic pen and a digitizer to obtain coordinates of the electromagnetic pen on the digitizer, the digitizer having a plurality of horizontal windings arranged in parallel along a horizontal direction and a plurality of vertical windings arranged in parallel along a vertical direction, and the electromagnetic manuscript input method comprising:

emitting a driving control signal by a coordinate controller of the digitizer, to drive a driving circuit of the digitizer, thus emitting a driving signal by the driving circuit to a first horizontal winding and a first vertical winding of the digitizer;

detecting an induction potential with a detection circuit of the digitizer, wherein the induction potential is generated according to induction of the first horizontal winding or the first vertical winding to an electromagnetic wave emitted by the electromagnetic pen;

converting the induction potential into a first digital signal with an analog-to-digital (ADC) converter, and transmitting the first digital signal to the coordinate controller, wherein the coordinate controller comprises a processor;

recording the first digital signal by the processor in the coordinate controller, and transmitting a second driving control signal to a second horizontal winding or a second vertical winding;

performing a detection and conversion operation with the detection circuit and the ADC, to generate a second digital signal and transmit the second digital signal to the coordinate controller;

comparing the first digital signal with the second digital signal to find out a larger one, and recording the larger one of the first digital signal and the second digital signal by the processor of the coordinate controller;

transmitting a third driving control signal by the coordinate controller, and performing a detection and conversion operation to the third driving control signal with the detection circuit and the ADC, to generate a third digital signal corresponding to the third driving control signal, and comparing the third digital signal with the recorded larger one to determine and record an updated larger digital signal;

repeatedly transmitting driving control signals and performing the detection and conversion operations until all of the horizontal windings and the vertical windings have been conducted with the detection and conversion operations to determine a finally updated larger digital signal and the corresponding horizontal and vertical windings having a maximum induction potential and record a maximum horizontal position and a maximum vertical position corresponding to the horizontal winding and the vertical winding having the maximum induction potential by the processor;

obtaining two adjacent horizontal positions and two adjacent vertical positions, immediately adjacent to the maximum horizontal position and the maximum vertical position, respectively, and recording the three horizontal positions and the three vertical positions with the processor;

emitting corresponding driving signals according to the three horizontal positions and the three vertical positions by the processor of the coordinate controller, and recording six corresponding induction potentials with the processor; and calculating the coordinates of the electromagnetic pen with a coordinate algorithm corresponding to a Gauss distribution function of the induction potentials;

wherein the coordinate algorithm uses the following equation to calculate the coordinate D of the electromagnetic pen in the horizontal or vertical direction:

$$D = XP0 + T/2 * \ln(VPR/VPL)/\ln(VP0^2/VPR/VPL),$$

wherein XP0 and VP0 are the coordinate and corresponding induction potential of the maximum horizontal or maximum vertical position, VPR and VPL are the corresponding induction potentials of the two adjacent horizontal or vertical positions, T is a coordinate value of a space between two neighboring horizontal or vertical windings, and ln represents a logarithm function.

2. The electromagnetic manuscript input method according to claim 1, wherein the electromagnetic pen comprises a winding, a capacitor, and a circuit board, for emitting the electromagnetic wave.

3. The electromagnetic manuscript input method according to claim 1, wherein the electromagnetic pen comprises a battery for providing a power to the electromagnetic pen.

4. The electromagnetic manuscript input method according to claim 1, wherein the coordinate algorithm is realized by a corresponding calculation software program executed by the processor of the coordinate controller.

5. The electromagnetic manuscript input method according to claim 1, wherein the digitizer further comprises a frequency counter, for counting an amount of induction potentials processed by the detection circuit, and outputting a notification signal to the coordinate controller when all of the windings have been scanned, so as to allow the coordinate controller reconfirming to avoid misoperation.

6. The electromagnetic manuscript input method according to claim 1, wherein the coordinate algorithm is realized by a log circuit and an operational circuit.

7. An electromagnetic manuscript input apparatus, comprising:
   an electromagnetic pen, for emitting an electromagnetic wave, the electromagnetic pen comprises a winding, a capacitor, and a circuit board; and
   a digitizer, comprising:
   a plurality of horizontal windings, parallel arranged along a horizontal direction of the digitizer, for inducing the electromagnetic wave emitted by the electromagnetic pen and generating a corresponding induction potential;
   a plurality of vertical windings, parallel arranged along a vertical direction of the digitizer, for inducing the electromagnetic wave emitted by the electromagnetic pen and generating a corresponding induction potential;
   a coordinate controller, comprising a processor, wherein the processor emits a driving control signal for performing a scanning operation to one of the horizontal windings or one of the vertical windings;
   a detection circuit, for detecting an induction potential of the one of the horizontal windings or one of the vertical windings which is driven by the driving control signal;
   an analog-to-digital (ADC) converter for receiving the detected induction potential, and converting the detected induction potential into a digital signal, and transmitting the digital signal to the coordinate controller;
   a frequency counter, for counting an amount of induction potentials processed by the detection circuit, and outputting a notification signal to the coordinate controller when all of the windings have been scanned, so as to allow the coordinate controller reconfirming to avoid misoperation;
   a log circuit, for receiving the digital signal from the ADC, and performing a log calculation to generate a log signal when an enabling signal inputted by the coordinate controller is at a high level, and stopping the log calculation when the enabling signal is at a low level; and
   an operational circuit, for receiving a log signal from the log circuit to perform operations comprising multiply, add, and divide operations, to obtain coordinates of the electromagnetic pen on the digitizer,
   wherein the coordinate controller is adapted for emitting an enabling signal having a low level to the log circuit before the completion of the scanning operation to all of the horizontal windings and vertical windings, emitting an enabling signal having a high level to the log circuit after the completion of the scanning operation to all of the horizontal windings and vertical windings,
   wherein, during the scanning operation, the coordinate controller compares values of digital signals inputted from the ADC, for finding out a position of a horizontal winding having a maximum induction potential and positions of two horizontal windings immediately adjacent to the horizontal winding having the maximum induction potential, and further finding out a position of a vertical winding having a maximum induction potential and positions of two vertical windings immediately adjacent to the vertical winding having the maximum induction potential, and
   wherein the coordinates of the electromagnetic pen on the digitizer are obtained by using a corresponding coordinate algorithm of a Gauss distribution function with the log circuit, and the operational circuit with the following equation:

$$D=XP0+T/2*\ln(VPR/VPL)/\ln(VP0^2/VPR/VPL),$$

wherein D is the coordinate of the electromagnetic pen in the horizontal or vertical direction, XP0 and VP0 are the coordinate and corresponding induction potential of the position of the horizontal or vertical winding having the maximum induction potential, VPR and VPL are the corresponding induction potentials of the two positions immediately adjacent to the horizontal or vertical winding having the maximum induction potential, T is a coordinate value of a space between two neighboring horizontal or vertical windings, and ln represents a logarithm function.

8. The electromagnetic manuscript input apparatus according to claim 7, wherein the coordinate algorithm comprises multiply, add, and divide operations.

9. The electromagnetic manuscript input apparatus according to claim 7, wherein the digitizer further includes a non-volatile memory, for storing a software program executable by the coordinate controller.

10. An electromagnetic manuscript input apparatus, comprising:
   an electromagnetic pen, for emitting an electromagnetic wave, the electromagnetic pen comprises a winding, a capacitor, and a circuit board; and
   a digitizer, comprising:
   a plurality of horizontal windings, parallel arranged along a horizontal direction of the digitizer, for inducing the electromagnetic wave emitted by the electromagnetic pen and generating a corresponding induction potential;
   a plurality of vertical windings, parallel arranged along a vertical direction of the digitizer, for inducing the electromagnetic wave emitted by the electromagnetic pen and generating a corresponding induction potential;
   a coordinate controller, comprising a processor, wherein the processor emits a driving control signal for performing a scanning operation to one of the horizontal windings or one of the vertical windings;
   a detection circuit, for detecting an induction potential of the one of the horizontal windings or one of the vertical windings which is driven by the driving control signal;
   an analog-to-digital (ADC) converter for receiving the detected induction potential, and converting the detected induction potential into a digital signal, and transmitting the digital signal to the coordinate controller; and
   a frequency counter, for counting an amount of induction potentials processed by the detection circuit, and outputting a notification signal to the coordinate controller when all of the windings have been scanned, so as to allow the coordinate controller reconfirming to avoid misoperation,
   wherein, during the scanning operation, the coordinate controller compares values of digital signals inputted from the ADC, for finding out a position of a horizontal winding having a maximum induction potential and positions of two horizontal windings immediately adjacent to the horizontal winding having the maximum induction potential, and further finding out a position of a vertical winding having a maximum induction potential and positions of two vertical windings immediately adjacent to the vertical winding having the maximum induction potential, and
   wherein the coordinates of the electromagnetic pen on the digitizer are obtained by using a corresponding coordinate algorithm of a Gauss distribution function with the following equation:

$$D=XP0+T/2*\ln(VPR/VPL)/\ln(VP0^2/VPR/VPL),$$

wherein D is the coordinate of the electromagnetic pen in the horizontal or vertical direction, XP0 and VP0 are the coordinate and corresponding induction potential of the position of the horizontal or vertical winding having the maximum induction potential, VPR and VPL are the corresponding induction potentials of the two positions immediately adjacent to the horizontal or vertical winding having the maximum induction potential, T is a coordinate value of a space between two neighboring horizontal or vertical windings, and ln represents a logarithm function.

11. The electromagnetic manuscript input apparatus according to claim 10, wherein the coordinate algorithm comprises multiply, add, and divide operations.

* * * * *